United States Patent
Channer et al.

(10) Patent No.: US 6,491,268 B1
(45) Date of Patent: Dec. 10, 2002

(54) PLATFORM ASSEMBLY FOR SUPPORTING PORTABLE COMPUTERS AND THE LIKE

(75) Inventors: Stephen P. Channer, Grand Rapids, MI (US); Daniel E. Waugh, Kentwood, MI (US); Mark D. Swets, Grand Rapids, MI (US)

(73) Assignee: Steelcase Development Corporation, Caledonia, MI (US)

( * ) Notice: Subject to any disclaimer, the term of this patent is extended or adjusted under 35 U.S.C. 154(b) by 0 days.

(21) Appl. No.: 09/685,452

(22) Filed: Oct. 9, 2000

(51) Int. Cl.[7] .............................................. F16M 11/00
(52) U.S. Cl. ............... 248/176.1; 248/918; 248/220.31; 248/510; 108/55.5; 24/458; 24/506
(58) Field of Search ......................... 248/176.1, 178.1, 248/179.1, 180.1, 183.2, 917–923, 510, 316.5, 354.7, 292.12, 220.31, 81, 316.1; 108/55.5, 55.3, 55.1; 206/597; 24/506, 517, 457, 458, 498, 499, 615

(56) References Cited

U.S. PATENT DOCUMENTS

| 764,238 | A | * | 7/1904 | Hamilton | 24/498 |
|---|---|---|---|---|---|
| 1,351,148 | A | | 8/1920 | Alexander | 269/204 |
| 1,676,289 | A | | 7/1928 | Schmalz | 269/93 |
| 2,733,492 | A | * | 2/1956 | Copell | 248/316.7 |
| 2,781,803 | A | | 2/1957 | Nelson | 269/91 |
| 2,803,277 | A | | 8/1957 | Gamura | 269/93 |
| 2,853,761 | A | * | 9/1958 | Kettell et al. | 24/499 |
| 2,953,830 | A | * | 9/1960 | MacRae | 56/400 |
| 3,420,482 | A | * | 1/1969 | Taylor | 248/71 |
| 4,475,726 | A | | 10/1984 | Smith | 269/41 |
| 4,645,166 | A | * | 2/1987 | Checkley et al. | 248/503.1 |
| 4,783,036 | A | * | 11/1988 | Vossoughi | 248/281.1 |
| 4,909,159 | A | * | 3/1990 | Gonsoulin | 108/44 |
| 4,957,264 | A | * | 9/1990 | Hakanen | 248/510 |
| 5,234,206 | A | | 8/1993 | Shih | 269/231 |
| 5,305,502 | A | * | 4/1994 | Abrahams | 24/517 |
| 5,595,074 | A | * | 1/1997 | Munro | 70/58 |
| 5,623,869 | A | | 4/1997 | Moss et al. | 108/43 |
| 5,673,628 | A | | 10/1997 | Boos | 108/44 |
| 5,769,369 | A | | 6/1998 | Meinel | 248/176.1 |
| 5,979,940 | A | | 11/1999 | Araghi | 281/45 |
| 6,010,121 | A | | 1/2000 | Lee | 269/94 |

OTHER PUBLICATIONS

Appendix A is a brochure illustrating a prior art Flat Screen Monitor Arm sold at least as early as Jul., 1999.

* cited by examiner

Primary Examiner—Ramon O. Ramirez
Assistant Examiner—Jon Szumny
(74) Attorney, Agent, or Firm—Price, Heneveld, Cooper, DeWitt & Litton

(57) ABSTRACT

A platform assembly for supporting a portable computer. The platform assembly includes a support member having an outer perimeter and a plurality of engagement features spaced inwardly of the perimeter. The support member defines a support surface configured to provide weight bearing support to a portable computer. The platform assembly also includes a plurality of securing devices, each of the securing devices having fastening members releasably securably engagable with a selected one of the engagement features. Each of the securing devices has a clamping surface adapted to engage a portable computer, and the clamping surface is positionable to bear against a portable computer with a clamping force directed generally towards the support surface.

14 Claims, 3 Drawing Sheets

PLATFORM ASSEMBLY FOR SUPPORTING PORTABLE COMPUTERS AND THE LIKE

BACKGROUND OF THE INVENTION

The present invention relates to a platform for supporting portable computers and the like, and in particular to a platform that can be quickly and easily adapted to support a variety of such portable computers.

Personal computers are becoming more and more common in many industries and office environments. Such systems typically employ a keypad, mouse, and/or other data input devices, such as a digitizing pad. In addition to conventional personal computers, compact portable or "notebook" or "laptop" computers have also become popular due to the portability of such computers. Such portable computers typically include a base having a plurality of input keys, and a flip up top/screen that is pivotally mounted to the base. Typically the top/screen can be pivoted to a closed position for transport, and pivoted upwardly for use.

A number of devices have been developed to support conventional personal computer keyboards, monitors, and the like. However, such devices are generally not suitable for supporting a portable computer due to the dimensions of the portable computer and other such constraints.

To date, no one has developed an adjustable platform that can be readily adapted to support a variety of portable computers, that is adjustable to provide a comfortable viewing height for the portable computer screen.

SUMMARY OF THE INVENTION

One aspect of the present invention is to provide a platform assembly for supporting a portable computer. The platform assembly includes a support member having an outer perimeter and a plurality of engagement features spaced inwardly of the perimeter. The support member defines a support surface configured to provide weight bearing support to a portable computer. The platform assembly also includes a plurality of securing devices, each of the securing devices having fastening members releasably securably engagable with a selected one of the engagement features. Each of the securing devices has a clamping surface adapted to engage a portable computer, and the clamping surface is positionable to bear against a portable computer with a clamping force directed generally towards the support surface.

Another aspect of the present invention is a platform assembly for supporting a portable computer of the type having a generally flat base defining an upper surface and a perimeter. The platform assembly includes a support member having an upper surface configured to support a portable computer thereon. The platform assembly also includes at least one clamp positioned on the support member. The clamp is configured to press on the upper surface of the base of a portable computer positioned on the support member to clamp the base to the support member.

Yet another aspect of the present invention is a platform assembly for supporting a portable computer. The platform assembly includes a support member defining an upper surface configured to provide a weight bearing support for a portable computer. The platform assembly also includes a pair of horizontally spaced apart ratcheting clamps configured to clamp a portable computer against the upper surface of the support member.

These and other features, advantages, and objects of the present invention will be further understood and appreciated by those skilled in the art by reference to the following specification, claims, and appended drawings.

DETAILED DESCRIPTION OF PREFERRED EMBODIMENT

Figure 1:
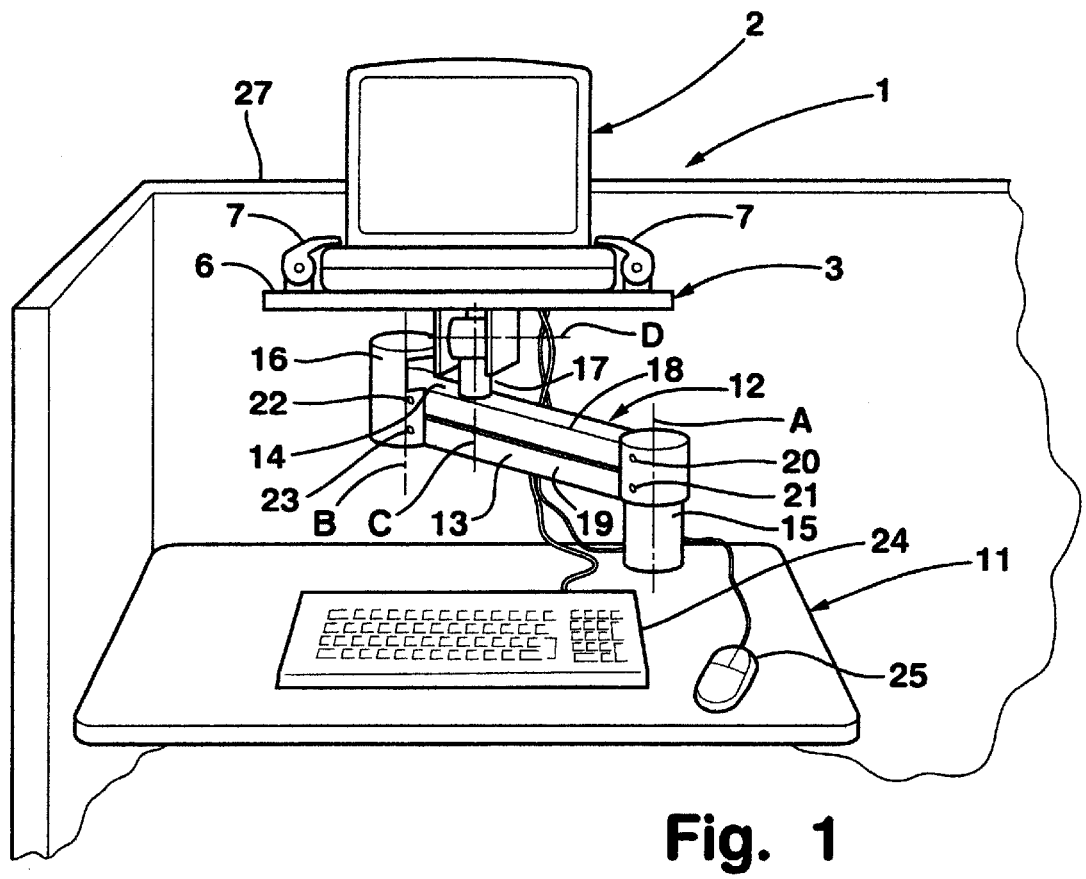
FIG. 1 is a perspective view of a platform assembly for supporting a portable computer according to the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
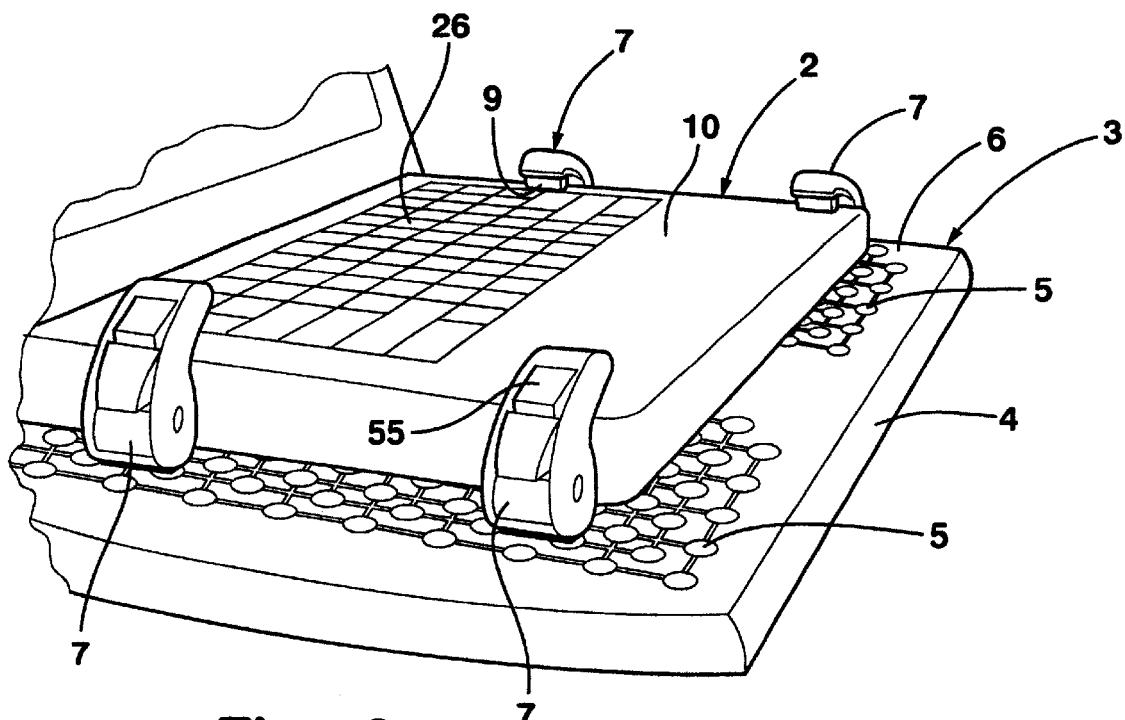
FIG. 2 is a partially fragmentary, perspective view of the platform assembly of FIG. 1.

The reference numeral 1 (FIG. 1) generally designates a platform assembly for supporting a portable notebook computer 2 embodying the present invention, which is particularly designed for use in offices, and other similar settings and environments. In the illustrated example, the platform assembly includes a support member such as platform 3 having an outer perimeter 4 (see also FIG. 2) and a plurality of engagement features such as openings 5 spaced inwardly of the perimeter 4. The platform 3 defines a support surface 6 configured to provide weight bearing support for a portable computer 2. The platform assembly 1 also includes a plurality of securing devices such as clamps 7. Each of the clamps 7 include at least one fastening member 8 (see also FIG. 4) that are releasably, securably engagable with a selected one of the engagement features or openings 5. Each of the clamps include a clamping surface 9 adapted to engage the portable computer 2. The clamping surface is positionable to bear against the upper surface 10 of the portable computer 2 with a clamping force directed generally towards the support surface 6.

The platform assembly 1 of the present invention is adjustably mounted to a worksurface 11 via an articulating support arm 12 having a lower link 13, and an upper link 14. Articulating support 12 is an existing Steelcase product that is presently used to support flat screen monitors and the like. Because the support arm 12 is an existing prior art device, the support arm 12 will not be described in detail herein. Base 15 of support arm 12 is secured to the worksurface 11, and lower link 13 is pivotally mounted to base 15 about a vertical axis "A". Upper link 14 is pivotally mounted to lower link 13 at joint 16, and pivots relative to lower link 13 about a vertical axis "B". Platform 3 is mounted to upper link 14 by a joint 17. Joint 17 permits pivoting of platform 3 about a vertical axis "C", and a horizontal axis "D" relative to the upper link 14. Lower link 13 includes an upper member 18, and a lower member 19 forming a four bar linkage to provide height adjustment. A gas cylinder (not shown) biases the link 13 upwardly to support the weight of the platform 3 and computer 2. Upper member 18 is pivotally mounted to base 15 at a pivot point 20, and to joint 16 at pivot point 22. Similarly, member 19 is pivotally mounted to base 15 at a pivot point 21, and member 19 is pivotally mounted to joint 16 at a pivot point 23. Accordingly, the articulating support arm 12 permits positioning of the platform 3 and portable computer 2 at a variety of vertical and horizontal positions, and also permits tilting of the platform 3.

A conventional computer keyboard and mouse 25 or other input device may be positioned on the worksurface 11 and connected to the portable computer 2. This permits a user to utilize a standard full sized computer keyboard 24 in conjunction with the portable computer 2, rather than the keypad 26 (see also FIG. 2) of the portable computer 2. The worksurface 11 and platform assembly 1 may be positioned in or adjacent an office partition system 27 to provide the desired level of privacy for a user.

Figure 3:
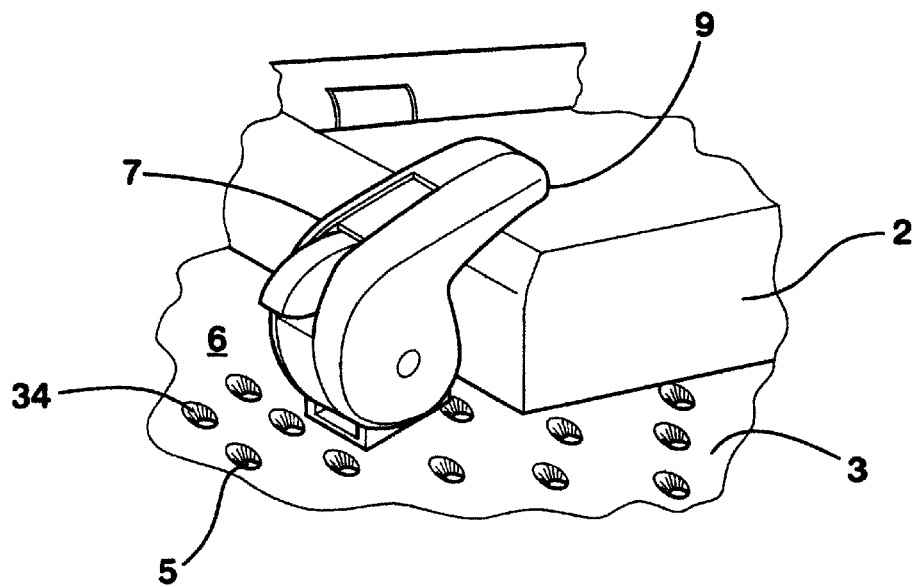
FIG. 3 is a fragmentary, perspective view illustrating a clamp from FIG. 2.
Figure 4:
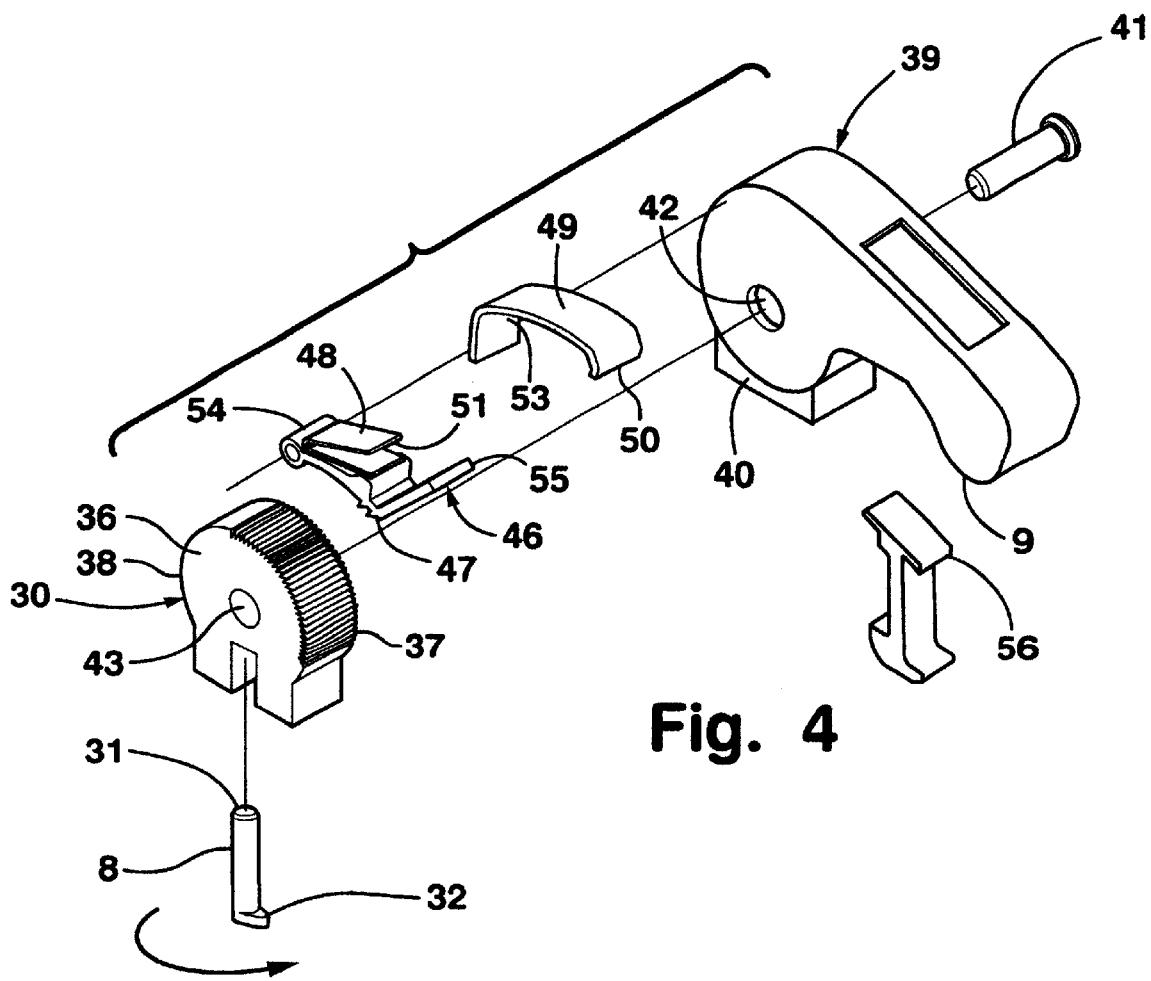
FIG. 4 is an exploded perspective view of the clamp of FIG. 3.
Figure 5:
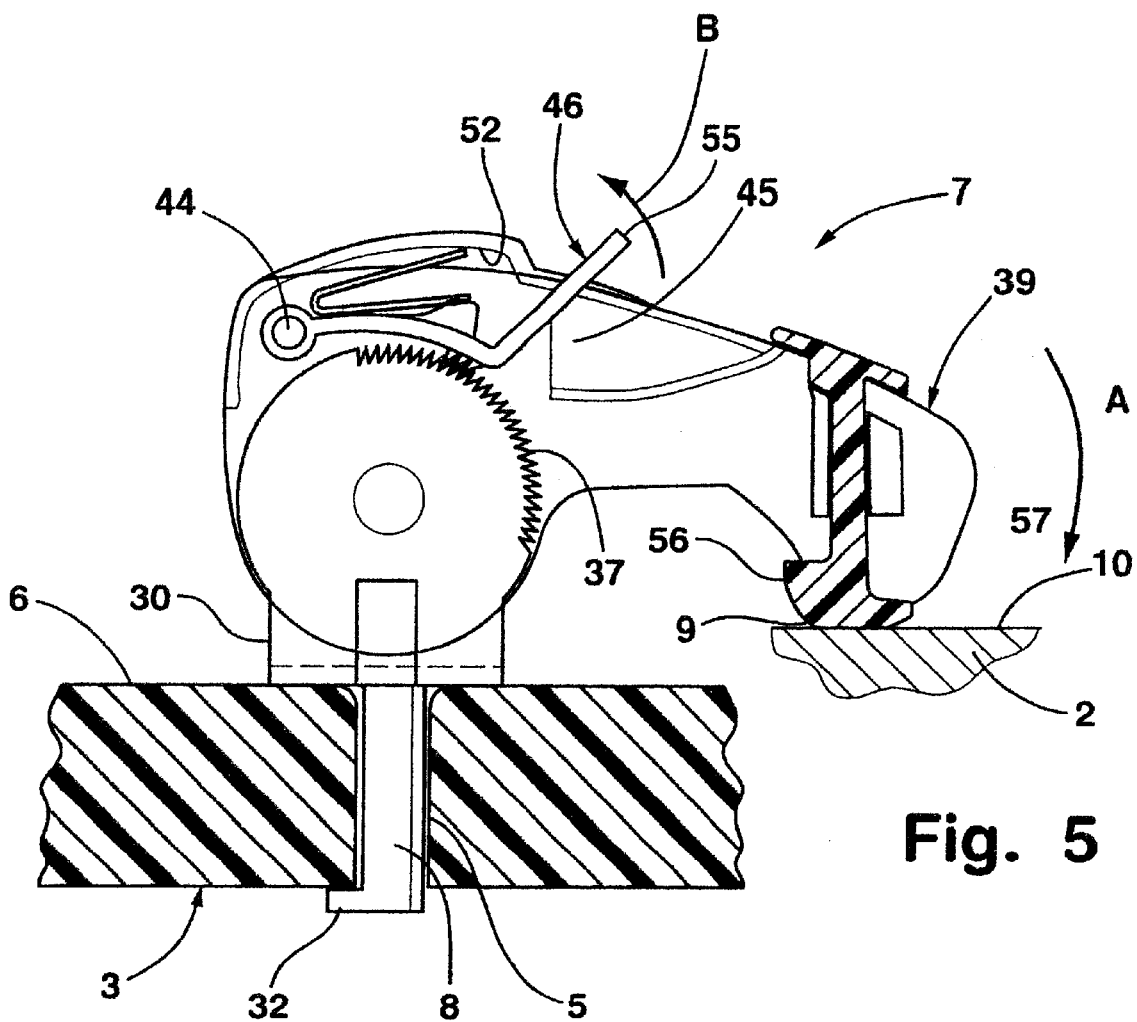
FIG. 5 is a fragmentary cross-sectional view of the clamp of FIG. 3.
Figure 6:
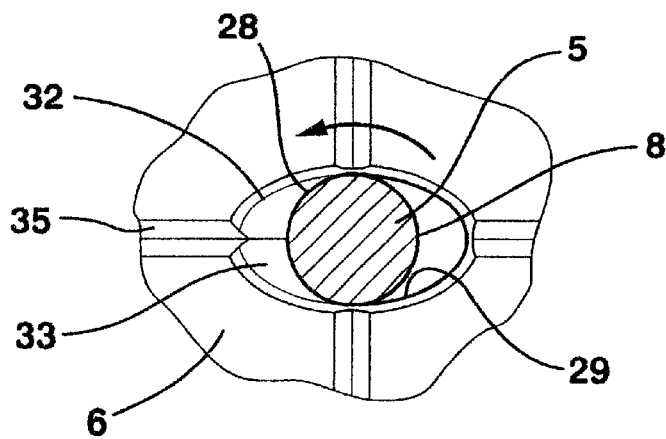
FIG. 6 is a fragmentary, cross-sectional view of the fastening member of the clamp of FIG. 3.

With further reference to FIGS. 3–5, openings 5 extend through platform 3 and have an "egg shape" including a generally semicircular portion 28 and an elongated generally elliptical portion 29. Fastening members 8 include a foot 32 having a cross-sectional shape corresponding to the opening 5, but having an outer contour that is slightly smaller than the inner surface of the opening 5 such that foot 32 can be inserted into the opening 5 when aligned with the opening. Each fastening member 8 is rotatably mounted to a clamp base 30, such that the clamp 7 can be secured to a selected one of the openings 5 by inserting foot 32 through the selected opening 5. The foot 32 is then rotated until the foot 32 is directly adjacent to or in contact with, lower surface 33 of platform 3. The upper end 34 of each opening 34 is tapered to facilitate insertion of the fastening member 8 into the openings 5. A plurality of openings 5 are provided in the platform 3, such that clamps 7 can be selectively positioned in any one of the openings 5. This arrangement permits the horizontal spacing between clamps 7 to be readily adjusted, such that portable computers or other items of various sizes can be readily secured to the platform 3. A series of V-grooves 35 forming a grid are provided in the support surface 6 for decorative purposes.

With reference to FIGS. 4 and 5, clamp 7 includes a base 30 having a disk-shaped portion 36 with a plurality of teeth 37 extending around a portion of the perimeter 38 of disk portion 36. Clamp arm 39 includes a lower clevis portion 40 that fits over the disk-shaped portion 36 of base 30. Clamp arm 39 is pivotally mounted to the base 30 by a pin 41 that fits through openings 42 in clamp arm 39 and opening 43 in base 30. A locking element 46 is positioned within the open interior 46 of clamp arm 39, and pivotally mounted to the clamp arm 39 by a second pin 44. Locking element 46 includes locking teeth 47 that are biased into engagement with teeth 37 of base 30 by a spring 48. A small cover member 49 includes a first end 50 that fits over the outer end 51 of spring 48. Cover 49 also includes a covered end portion 53 that fits over the pivot end portion 54 of locking element 46. Cover 49 bears against the inner surface 52 of clamp arm 39, and spring 48 contacts the cover 49 such that spring 48 biases teeth 47 of locking element 46 into engagement with teeth 37 of base 30. Teeth 37 and 47 are shaped such that clamp arm 39 can be manually grasped and rotated downwardly in the direction of the arrow "A" (FIG. 5) to clamp down on the upper surface 10 of the portable computer 2. To release the clamp 7, the end portion 55 of locking element 46 is lifted upwardly in the direction of the arrow "B", thereby disengaging lock teeth 47 from teeth 37 of base 30. Clamp arm 39 can then be rotated upwardly, opposite the direction of the arrow "A" to release the clamping force on the portable computer 2. Clamp arm 39 preferably includes an elastomeric pad member 56 located adjacent the end portion 57 of clamp arm 39 and forming the clamping surface 9 that bears against the upper surface 10 of portable computer 2. In a preferred embodiment, platform 3 and clamp arm 39 are formed from a molded plastic material, and base 30, lock member 36 and cover 49 are made of a metal or other suitable material. Elastomeric member 56 is preferably made of rubber, or other resilient, high friction material providing a snug, secure grip on the portable computer 2.

The present invention provides a platform assembly 1 including ratcheting clamps 7 that can be quickly and easily moved to accommodate a variety of differently sized portable computers or other devices. The ratcheting clamps 7 can be quickly and easily grasped by a user and rotated into a locked position. The ratcheting clamps 7 are released by pushing upwardly on the end portion 55 of the locking element 46.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A platform assembly for supporting a portable computer, said platform assembly comprising:

a support member having an outer perimeter and a plurality of engagement features spaced inwardly of said perimeter, said support member defining a support surface configured to provide weight bearing support for a portable computer;

a plurality of securing devices, each of said securing devices having at least one fastening member releasably securably engagable with a selected one of said engagement features, each of said securing devices having a clamping surface adapted to engage the portable computer, said clamping surface positionable to bear against the portable computer with a clamping force directed generally towards said support surface; and wherein:

said engagement features comprise a plurality of non-circular apertures; and said fastening members comprise projections insertable in selected ones of said apertures, each releasably engagable upon rotation of said projection.

2. The platform assembly set forth in claim 1, including:

an articulating arm repositionably supporting said platform assembly in proximity to an associated worksurface panel.

3. The platform assembly set forth in claim 1, wherein:

said clamping surface is formed, at least in part, by a resilient elastomeric member.

4. The platform assembly set forth in claim 1, wherein:

said securing devices include a ratchet that maintains the clamping force of the clamping surface.

5. A platform assembly for supporting a portable computer, said platform assembly comprising:

a support member having an outer perimeter and a plurality of engagement features spaced inwardly of said perimeter, said support member defining a support surface configured to provide weight bearing support for a portable computer;

a plurality of securing devices, each of said securing devices having at least one fastening member releasably securably engagable with a selected one of said engagement features, each of said securing devices having a clamping surface adapted to engage the portable computer, said clamping surface positionable to bear against the portable computer with a clamping force directed generally towards said support surface; and wherein:

said securing devices include a base member positionable on said support member, said base members including a plurality of teeth, said securing devices further including a clamp arm rotatably connected to said base member and forming said clamping surface, said clamp arm movable between a clamped position and a released position, said securing devices further including a locking element engagable with at least a selected one of said teeth to retain said clamp arm in said clamped position.

6. The platform assembly set forth in claim 5, wherein:

said securing devices include a biasing element biasing said locking element into engagement with at least a selected one of said teeth.

7. A platform assembly for supporting a portable computer of the type having a generally flat base defining an upper surface and a perimeter, said platform assembly comprising:

a support member having an upper surface configured to support a portable computer thereon;

at least one clamp positioned on said support member, said clamp configured to press on the upper surface of the base of a portable computer positioned on said support member to clamp the base to the support member;

said support member includes a plurality of horizontally spaced-apart engagement features;

said at least one clamp includes a fastening member releasably engagable with a selected one of said engagement features; and wherein:

said engagement features comprise a plurality of non-circular apertures; and said fastening members comprise projections insertable in selected ones of said apertures, each releasably engagable upon rotation of said projection.

8. The platform assembly set forth in claim 7, wherein:

said clamp includes a resilient elastomeric portion forming a clamping surface.

9. The platform assembly set forth in claim 7, wherein:

said clamp includes a ratchet that retains said clamp in the clamped position.

10. A platform assembly for supporting a portable computer, comprising:

a support member including a plurality of horizontally spaced-apart engagement features and defining an upper surface configured to provide a weight bearing support for a portable computer;

a pair of horizontally spaced apart ratcheting clamps configured to clampingly secure a portable computer on said upper surface of said support member, said ratcheting clamps including fastening members releasably engagable with selected ones of said engagement features such that the position of said ratcheting clamps can be changed; and wherein:

said engagement features comprise a plurality of non-circular apertures; and said fastening members comprise projections insertable in selected ones of said apertures, each releasably engagable upon rotation of said projection.

11. The platform assembly set forth in claim 10, wherein:

said ratcheting clamps include a clamping surface formed, at least in part, by a resilient elastomeric member.

12. The platform assembly set forth in claim 10, wherein:

said ratcheting clamps include a releasable locking element that retains said clamps in a clamped position, yet permitting release of said ratcheting clamps.

13. The platform assembly set forth in claim 12, wherein:

said ratcheting clamps include a toothed cylinder; and said locking element is biased into engagement with said toothed cylinder.

14. The platform assembly set forth in claim 10, wherein:

said pair of horizontally spaced apart ratcheting clamps comprises a first pair of ratcheting clamps; and including:

a second pair of horizontally spaced apart ratcheting clamps.

* * * * *